United States Patent
Yuan et al.

(10) Patent No.: US 10,333,563 B2
(45) Date of Patent: Jun. 25, 2019

(54) WIRELESS TERMINAL AND ANTENNA SWITCHING CONTROL METHOD FOR WIRELESS TERMINAL

(71) Applicant: Huawei Technologies Co., Ltd., Shenzhen (CN)

(72) Inventors: Linghua Yuan, Shanghai (CN); Dongxing Tu, Shenzhen (CN); Zhijun Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/067,719

(22) PCT Filed: Dec. 31, 2015

(86) PCT No.: PCT/CN2015/100147
§ 371 (c)(1),
(2) Date: Jul. 2, 2018

(87) PCT Pub. No.: WO2017/113304
PCT Pub. Date: Jul. 6, 2017

(65) Prior Publication Data
US 2019/0007072 A1    Jan. 3, 2019

(51) Int. Cl.
*H04W 72/00*    (2009.01)
*H04B 1/00*    (2006.01)
(Continued)

(52) U.S. Cl.
CPC ........... *H04B 1/006* (2013.01); *H04B 1/0057* (2013.01); *H04B 1/0064* (2013.01); *H04B 1/401* (2013.01); *H04W 88/06* (2013.01)

(58) Field of Classification Search
CPC .... H04B 1/006; H04B 1/0057; H04B 1/0064; H04B 1/401; H04B 88/06
(Continued)

(56) References Cited

U.S. PATENT DOCUMENTS 7,486,955 B2 * 2/2009 Fukushima ........... G06F 1/1616
455/452.1
9,484,619 B2 * 11/2016 Korva ..................... H01Q 1/243
(Continued)

FOREIGN PATENT DOCUMENTS

CN         101567704 A    10/2009
CN          10368622 A    10/2013
(Continued)

OTHER PUBLICATIONS

Machine Translation and Abstract of Chinese Publication No. CN103368622, Oct. 23, 2013, 27 pages.
(Continued)

*Primary Examiner* — Sonny Trinh
(74) *Attorney, Agent, or Firm* — Conley Rose, P.C.

(57) ABSTRACT

A wireless terminal and an antenna switching control method for a wireless terminal, where the wireless terminal includes a main antenna, a first antenna, and a second antenna. The main antenna is connected to a first radio frequency circuit and configured to receive and transmit a first standard signal. A frequency band of the first standard signal includes a first frequency band with a super high frequency and a second frequency band with a high frequency. The first antenna is configured to receive a first standard signal of the first frequency band, and receive and transmit a second standard signal. The second antenna is connected to the first radio frequency circuit and configured to receive a first standard signal of the second frequency band. Hence an overall size of the wireless terminal can be reduced using the second antenna.

13 Claims, 8 Drawing Sheets

(51) Int. Cl.
*H04B 1/401* (2015.01)
*H04W 88/06* (2009.01)

(58) Field of Classification Search
USPC .......... 455/73, 450, 452.2, 63.3, 62, 552.1
See application file for complete search history.

(56) References Cited

U.S. PATENT DOCUMENTS

| | | | |
|---|---|---|---|
| 2005/0136875 A1 | 6/2005 | Skarby et al. | |
| 2009/0264086 A1 | 10/2009 | Song et al. | |
| 2012/0309332 A1 | 12/2012 | Liao | |
| 2013/0222206 A1* | 8/2013 | Park | H01Q 1/50 343/876 |
| 2014/0194116 A1 | 7/2014 | Jalloul et al. | |
| 2015/0180530 A1 | 6/2015 | Florentinus De Maaijer | |
| 2015/0295600 A1 | 10/2015 | King et al. | |
| 2017/0126257 A1 | 5/2017 | Wang et al. | |
| 2017/0358843 A1* | 12/2017 | Huang | H04B 7/0817 |
| 2017/0365914 A1* | 12/2017 | Hong | H01Q 3/24 |

FOREIGN PATENT DOCUMENTS

| | | |
|---|---|---|
| CN | 103401577 A | 11/2013 |
| CN | 104427656 A | 3/2015 |
| CN | 104618527 A | 5/2015 |
| CN | 104969481 A | 10/2015 |
| WO | 2005104389 A1 | 11/2005 |
| WO | 2009087438 A1 | 7/2009 |

OTHER PUBLICATIONS

Machine Translation and Abstract of Chinese Publication No. CN104618527, May 13, 2015, 30 pages.
Foreign Communication From a Counterpart Application, Chinese Application No. 201580063827.X, Chinese Office Action dated Aug. 21, 2018, 11 pages.
Machine Translation and Abstract of Chinese Publication No. 103401577, Nov. 20, 2013, 17 pages.
Machine Translation and Abstract of Chinese Publication No. 104427656, Mar. 18, 2015, 12 pages.
Foreign Communication From a Counterpart Application, PCT Application No. PCT/CN2015/100147, English Translation of International Search Report dated Sep. 12, 2016, 2 pages.
Foreign Communication From a Counterpart Application, PCT Application No. PCT/CN2015/100147, English Translation of Written Opinion dated Sep. 12, 2016, 3 pages.
Foreign Communication From a Counterpart Application, European Application No. 15911930.4, Extended European Search Report dated Sep. 27, 2018, 8 pages.

* cited by examiner

Detect an operating state of a first radio frequency circuit and that of a second radio frequency circuit — S61

If it is detected that the second radio frequency circuit receives and transmits a second standard signal and the first radio frequency circuit receives and transmits a first standard signal of a second frequency band, control a first antenna to receive and transmit the second standard signal, and control a second antenna to receive the first standard signal of the second frequency band — S62

WIRELESS TERMINAL AND ANTENNA SWITCHING CONTROL METHOD FOR WIRELESS TERMINAL

CROSS-REFERENCE TO RELATED APPLICATIONS

This application is a U.S. National Stage of International Patent Application No. PCT/CN2015/100147 filed on Dec. 31, 2015, which is hereby incorporated by reference in its entirety.

TECHNICAL FIELD

The present disclosure relates to the field of terminal technologies, and in particular, to a wireless terminal and an antenna switching control method for a wireless terminal.

BACKGROUND

With rapid development of terminal technologies, a terminal increasingly becomes an indispensable commodity of people. Multi-mode terminals are widely used at present. A multi-mode terminal may include multiple network standards, for example, Long Term Evolution (LTE), Global System for Mobile Communications (GSM), and Code Division Multiple Access (CDMA).

An example in which the wireless terminal includes two standards LTE and GSM is described below. Three antennas a main antenna, a diversity antenna, and a GSM antenna need to be disposed in the wireless terminal. The main antenna and the diversity antenna are full-band antennas. Because a GSM frequency band is at a relatively low frequency, the GSM antenna has a relatively large size. Therefore, the wireless terminal has a relatively large size.

SUMMARY

Embodiments of the present disclosure provide a wireless terminal and an antenna switching control method for a wireless terminal, to resolve a problem that a wireless terminal has a relatively large size because an antenna has a relatively large size in related technologies.

According to a first aspect, an embodiment of the present disclosure provides a wireless terminal, including a main antenna, a first antenna, and a second antenna, where the main antenna is connected to a first radio frequency circuit, and is configured to receive and transmit a first standard signal, where a frequency band of the first standard signal includes a first frequency band with a super high frequency and a second frequency band with a high frequency, the first antenna is connected to an antenna end of a frequency isolation module, a high frequency end of the frequency isolation module is connected to the first radio frequency circuit, a low frequency end of the frequency isolation module is connected to a second radio frequency circuit, and the first antenna is configured to receive a first standard signal of the first frequency band, and receive and transmit a second standard signal, where a frequency band of the second standard signal does not overlap the first frequency band, and the second antenna is connected to the first radio frequency circuit, and is configured to receive a first standard signal of the second frequency band.

Three antennas are disposed in the wireless terminal in this solution. The main antenna and the first antenna are full-band antennas. The second antenna receives the first standard signal of the second frequency band with a high frequency, and the second frequency band with a high frequency is higher than a GSM frequency band in related technologies. Therefore, in comparison with a size of a GSM antenna in the related technologies, a size of the second antenna is largely reduced, and correspondingly, a size of the wireless terminal is largely reduced. It can be learned that an overall size of the wireless terminal can be reduced using the second antenna in this solution.

With reference to the first aspect, in a first possible implementation of the first aspect, the wireless terminal further includes a switching module, where the switching module is connected to the first antenna, the second antenna, the antenna end of the frequency isolation module, and the first radio frequency circuit, and is configured to switch the first antenna to receive the first standard signal of the second frequency band.

In this solution, the switching module is disposed in the wireless terminal. Switching to the first antenna may be implemented to receive the first standard signal of the second frequency band in order to ensure that the first antenna with better performance is fully used and that the first standard signal of the second frequency band has better performance.

With reference to the first possible implementation of the first aspect, in a second possible implementation of the first aspect, the switching module includes a first single-pole double-throw switch and a second single-pole double-throw switch, where a non-movable end of the first single-pole double-throw switch is connected to the first antenna, and a movable end of the first single-pole double-throw switch switches between the antenna end of the frequency isolation module and the second single-pole double-throw switch, and a non-movable end of the second single-pole double-throw switch is connected to the first radio frequency circuit, and a movable end of the second single-pole double-throw switch switches between the first single-pole double-throw switch and the second antenna.

In this solution, the two single-pole double-throw switches may be configured to implement switching of the first antenna to receive the first standard signal of the second frequency band in order to ensure that the first antenna with better performance is fully used and that the first standard signal of the second frequency band has better performance.

With reference to the first possible implementation of the first aspect, in a third possible implementation of the first aspect, the switching module includes a double-pole double-throw switch, where two non-movable ends of the double-pole double-throw switch are respectively connected to the first antenna and the second antenna, and two movable ends of the double-pole double-throw switch are respectively connected to the antenna end of the frequency isolation module and the first radio frequency circuit, or two movable ends of the double-pole double-throw switch are respectively connected to the first antenna and the second antenna, and two non-movable ends of the double-pole double-throw switch are respectively connected to the antenna end of the frequency isolation module and the first radio frequency circuit.

In this solution, the double-pole double-throw switch may be configured to implement switching of the first antenna to receive the first standard signal of the second frequency band in order to ensure that the first antenna with better performance is fully used and that the first standard signal of the second frequency band has better performance.

According to a second aspect, an embodiment of the present disclosure further provides an antenna switching control method for a wireless terminal, where the wireless terminal includes a main antenna, a first antenna, a second antenna, a first radio frequency circuit that is configured to receive and transmit a first standard signal, a frequency isolation module, and a second radio frequency circuit that is configured to receive and transmit a second standard signal, the first standard signal includes a first frequency band with a super high frequency and a second frequency band with a high frequency, a frequency band of the second standard signal does not overlap the first frequency band of the first standard signal, and the method includes that if it is detected that the second radio frequency circuit receives and transmits the second standard signal and the first radio frequency circuit receives and transmits a first standard signal of the second frequency band, controlling the first antenna to receive and transmit the second standard signal, and controlling the second antenna to receive the first standard signal of the second frequency band.

With reference to the second aspect, in a first possible implementation of the second aspect, the method further includes that if it is detected that the second radio frequency circuit is in an idle state, controlling the first antenna to receive the first standard signal of the second frequency band.

With reference to the second aspect or the first possible implementation of the second aspect, in a second possible implementation of the second aspect, the method further includes that if it is detected that the second radio frequency circuit receives and transmits the second standard signal and the first radio frequency circuit receives and transmits the first standard signal of the second frequency band, in a communication process in which the second radio frequency circuit receives and transmits the second standard signal, controlling the first antenna to receive and transmit the second standard signal, and controlling the second antenna to receive the first standard signal of the second frequency band, and in a communication interval in which the second radio frequency circuit does not receive or transmit the second standard signal, controlling the first antenna to receive the first standard signal of the second frequency band.

With reference to the second aspect or the first possible implementation of the second aspect, in a third possible implementation of the second aspect, the method further includes if it is detected that the second radio frequency circuit receives and transmits the second standard signal and the first radio frequency circuit receives and transmits the first standard signal of the second frequency band, if the first standard signal is a data service signal, in a communication process in which the second radio frequency circuit receives and transmits the second standard signal, controlling the first antenna to receive and transmit the second standard signal, and controlling the second antenna to receive the first standard signal of the second frequency band, and in a communication interval in which the second radio frequency circuit does not receive or transmit the second standard signal, controlling the first antenna to receive the first standard signal of the second frequency band, or if the first standard signal is a voice service signal, controlling the first antenna to be configured to receive and transmit only the second standard signal, and controlling the second antenna to be configured to receive only the first standard signal of the second frequency band.

With reference to the second aspect, in a fourth possible implementation of the second aspect, the method further includes, in a process in which the first radio frequency circuit receives the first standard signal of the second frequency band, detecting antenna signal strength of the first antenna and that of the second antenna, and if it is detected that the antenna signal strength of the first antenna is less than a specified value, controlling the second antenna to receive the first standard signal of the second frequency band, or if it is detected that the antenna signal strength of the second antenna is less than the specified value and the second radio frequency circuit is in an idle state, controlling the first antenna to receive the first standard signal of the second frequency band.

It can be learned from the foregoing solution that the embodiments of the present disclosure provide the wireless terminal. The wireless terminal includes the main antenna, the first antenna, and the second antenna. The main antenna is connected to the first radio frequency circuit, and is configured to receive and transmit the first standard signal. The frequency band of the first standard signal includes the first frequency band with a super high frequency and the second frequency band with a high frequency. The first antenna is connected to the antenna end of the frequency isolation module. The high frequency end of the frequency isolation module is connected to the first radio frequency circuit. The low frequency end of the frequency isolation module is connected to the second radio frequency circuit. The first antenna is configured to receive the first standard signal of the first frequency band, and receive and transmit the second standard signal. The frequency band of the second standard signal does not overlap the first frequency band. The second antenna is connected to the first radio frequency circuit, and is configured to receive the first standard signal of the second frequency band. The second antenna receives the first standard signal of the second frequency band with a high frequency, and the second frequency band with a high frequency is higher than the GSM frequency band in the related technologies. Therefore, in comparison with the size of the GSM antenna in the related technologies, the size of the second antenna is largely reduced, and correspondingly, the size of the wireless terminal is largely reduced. It can be learned that the overall size of the wireless terminal can be reduced using the second antenna in this solution.

BRIEF DESCRIPTION OF DRAWINGS

Drawings of the specification that constitute a part of this application are used to provide further understanding of the present disclosure, and schematic embodiments of the present disclosure and descriptions thereof are used to explain the present disclosure, which do not constitute an improper limitation on the present disclosure.

To describe the technical solutions in the embodiments of the present disclosure more clearly, the following briefly describes the accompanying drawings required for describing the embodiments. A person of ordinary skill in the art may still derive other drawings from these accompanying drawings without creative efforts.

DESCRIPTION OF EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
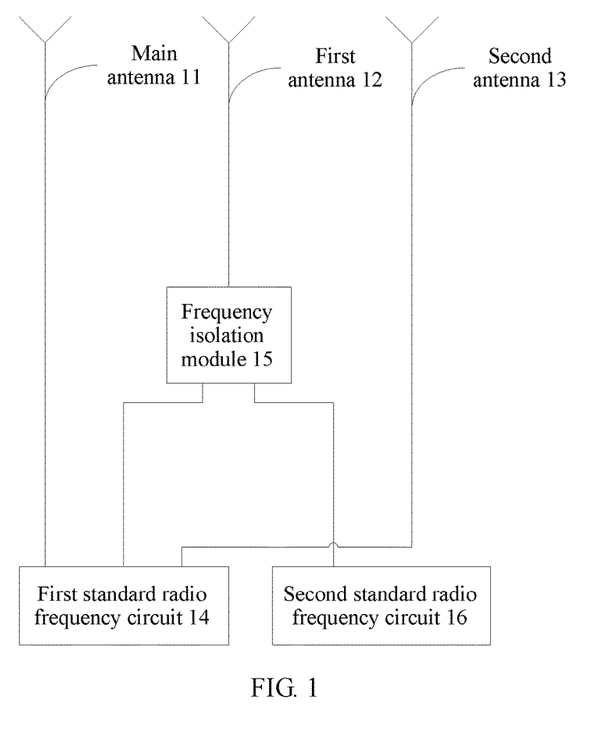
FIG. 1 is a schematic structural diagram of a wireless terminal according to an embodiment of the present disclosure.

Currently, many wireless terminals may include at least two standards. The at least two standards included in the wireless terminal vary with network operators. For example, when a network operator is Chinese Unicom, the wireless terminal may include two standards, LTE and GSM, or when a network operator is Chinese Mobile, the wireless terminal may include two standards, LTE and CDMA. Referring to FIG. 1, FIG. 1 is a schematic structural diagram of a wireless terminal according to an embodiment of the present disclosure. The wireless terminal includes a main antenna 11, a first antenna 12, a second antenna 13, a first radio frequency circuit 14, a frequency isolation module 15, and a second radio frequency circuit 16.

The main antenna 11 is connected to the first radio frequency circuit 14, and is configured to receive and transmit a first standard signal. A frequency band of the first standard signal includes a first frequency band with a super high frequency and a second frequency band with a high frequency. An example in which the first standard signal is an LTE signal is described below. In this case, the main antenna is an LTE main antenna, a range of the first frequency band with a super high frequency is more than 2300 megahertz (MHz), a range of the second frequency band with a high frequency is from 1710 MHz to 2170 MHz, and the first radio frequency circuit is an LTE transceiver radio frequency circuit.

The first antenna 12 is connected to an antenna end of the frequency isolation module 15. A high frequency end of the frequency isolation module 15 is connected to the first radio frequency circuit 14. A low frequency end of the frequency isolation module is connected to the second radio frequency circuit 16. The first antenna 12 is configured to receive a first standard signal of the first frequency band, and receive and transmit a second standard signal. A frequency band of the second standard signal does not overlap the first frequency band. An example in which the second standard signal is a GSM signal is described below. In this case, a range of a GSM frequency band is less than 1990 MHz. Because the range of the first frequency band of the LTE signal is more than 2300 MHz, the first frequency band of the LTE signal does not overlap the GSM frequency band. The frequency isolation module may be configured to implement isolation of the first frequency band of the LTE signal from the GSM frequency band. The second radio frequency circuit 16 is a GSM transceiver radio frequency circuit. The frequency isolation module 15 may be a diplexer, or the like. A principle of the diplexer is two filters.

The second antenna 13 is connected to the first radio frequency circuit 14, and is configured to receive a first standard signal of the second frequency band.

Three antennas are disposed in the wireless terminal in this embodiment. The main antenna 11 and the first antenna 12 are full-band antennas. The second antenna 13 receives the first standard signal of the second frequency band with a high frequency, and the second frequency band with a high frequency is higher than a GSM frequency band in related technologies. Therefore, in comparison with a size of a GSM antenna in related technologies, a size of the second antenna 13 is largely reduced, and correspondingly, a size of the wireless terminal is largely reduced. It can be learned that an overall size of the wireless terminal can be reduced using the second antenna 13 in this solution.

Figure 2:
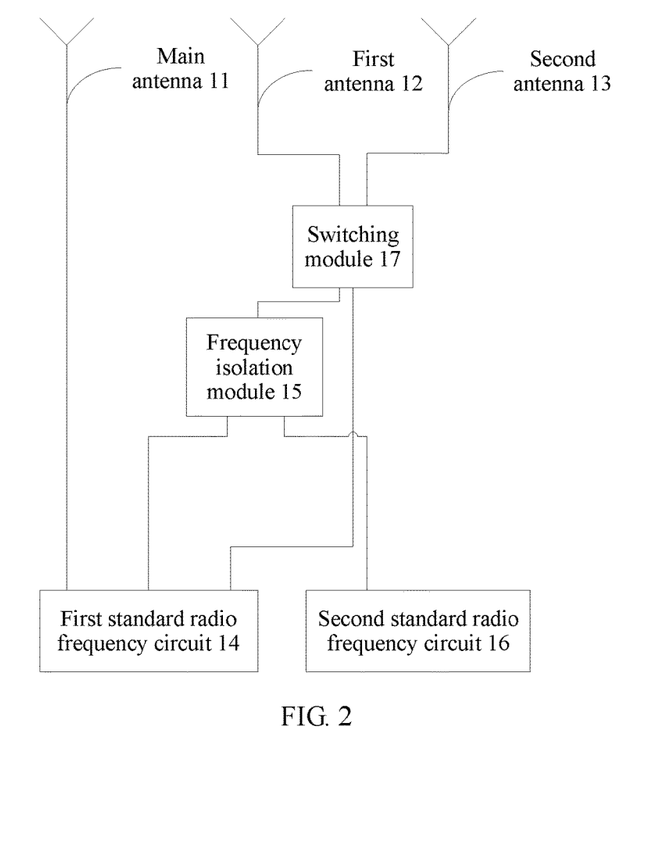
FIG. 2 is a schematic structural diagram of another wireless terminal according to an embodiment of the present disclosure.

Referring to FIG. 2, FIG. 2 is a schematic structural diagram of another wireless terminal according to an embodiment of the present disclosure. Based on the wireless terminal shown in FIG. 1, the wireless terminal further includes a switching module 17.

The switching module 17 is connected to the first antenna 12, the second antenna 13, the antenna end of the frequency isolation module 15, and the first radio frequency circuit 14, and is configured to switch the first antenna 12 to receive the first standard signal of the second frequency band.

Because the first antenna 12 is a full-band antenna, the first antenna 12 has better performance than the second antenna 13. For the GSM standard, the GSM transceiver radio frequency circuit is in a standby state in 90% of time. That is, the first antenna 12 is in an idle state in a lot of time. To make full use of the first antenna with better performance, according to a requirement, the switching module 17 may be configured to implement switching of the first antenna 12 to receive the first standard signal of the second frequency band.

The switching module 17 may be implemented in multiple manners. Two implementations are listed in the following for description.

Figure 3:
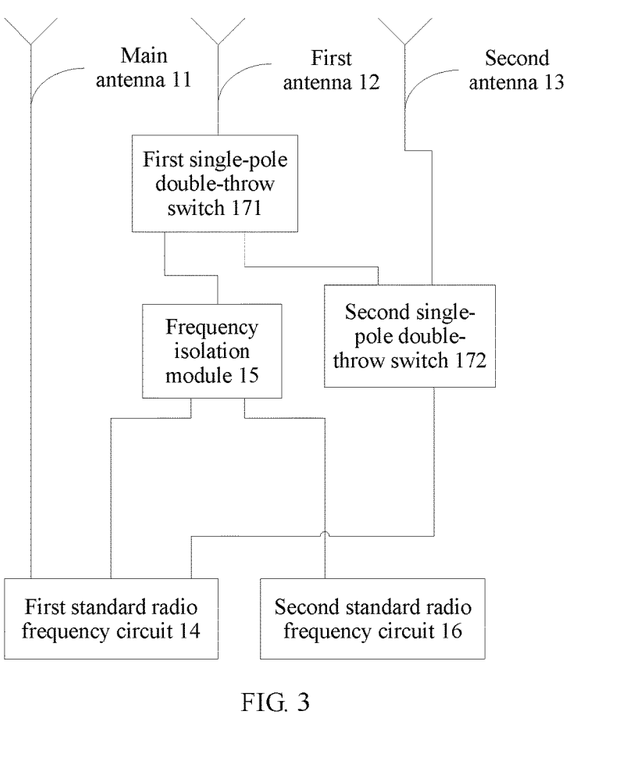
FIG. 3 is a schematic structural diagram of another wireless terminal according to an embodiment of the present disclosure.

In a first implementation, referring to a schematic structural diagram of a wireless terminal shown in FIG. 3, the switching module 17 includes a first single-pole double-throw switch 171 and a second single-pole double-throw switch 172.

A non-movable end of the first single-pole double-throw switch 171 is connected to the first antenna 12, and a movable end of the first single-pole double-throw switch 171 switches between the antenna end of the frequency isolation module 15 and the second single-pole double-throw switch 172. The movable end of the first single-pole double-throw switch 171 may be switched to implement connecting of the first antenna 12 to the frequency isolation module 15, or connecting of the first antenna 12 to the second single-pole double-throw switch 172.

A non-movable end of the second single-pole double-throw switch 172 is connected to the first radio frequency circuit 14, and a movable end of the second single-pole double-throw switch 172 switches between the first single-pole double-throw switch 171 and the second antenna 13. The movable end of the second single-pole double-throw switch 172 may be switched to implement connecting of the first radio frequency circuit 14 to the second antenna 13, or connecting of the first radio frequency circuit 14 to the first single-pole double-throw switch 171.

Figure 4:
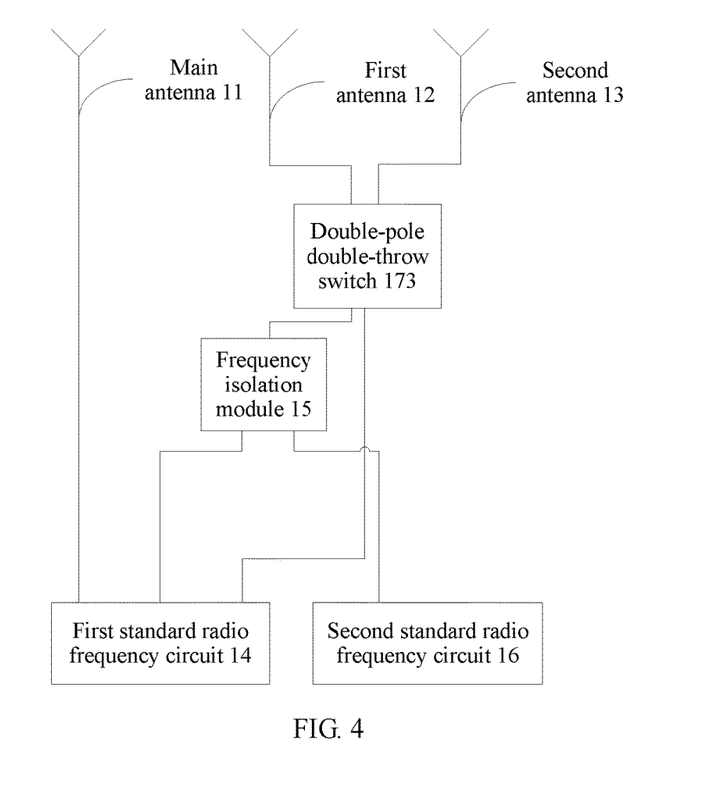
FIG. 4 is a schematic structural diagram of another wireless terminal according to an embodiment of the present disclosure.

In a second implementation, referring to a schematic structural diagram of a wireless terminal shown in FIG. 4, the switching module 17 includes a double-pole double-throw switch 173. The double-pole double-throw switch may be connected to the first antenna 12, the second antenna 13, the frequency isolation module 15, and the first radio frequency circuit 14 in the following two manners.

In a first manner, two non-movable ends of the double-pole double-throw switch 173 are respectively connected to the first antenna 12 and the second antenna 13, and two movable ends of the double-pole double-throw switch 173 are respectively connected to the antenna end of the frequency isolation module 15 and the first radio frequency circuit 14. The movable ends of the double-pole double-throw switch 173 may be switched to implement connecting of the first antenna 12 to the frequency isolation module 15 and connecting of the second antenna 13 to the first radio frequency circuit 14, or to implement connecting of the first antenna 12 to the first radio frequency circuit 14.

In a second manner, two movable ends of the double-pole double-throw switch 173 are respectively connected to the first antenna 12 and the second antenna 13, and two non-movable ends of the double-pole double-throw switch 173 are respectively connected to the antenna end of the frequency isolation module 15 and the first radio frequency circuit 14. The movable ends of the double-pole double-throw switch 173 may be switched to implement connecting of the first antenna 12 to the frequency isolation module 15 and connecting of the second antenna 13 to the first radio frequency circuit 14, or to implement connecting of the first antenna 12 to the first radio frequency circuit 14.

The two single-pole double-throw switches or the double-pole double-throw switch may be configured to implement switching of the first antenna to receive the first standard signal of the second frequency band in order to ensure that the first antenna with better performance is fully used and that the first standard signal of the second frequency band has better performance.

Figure 5:
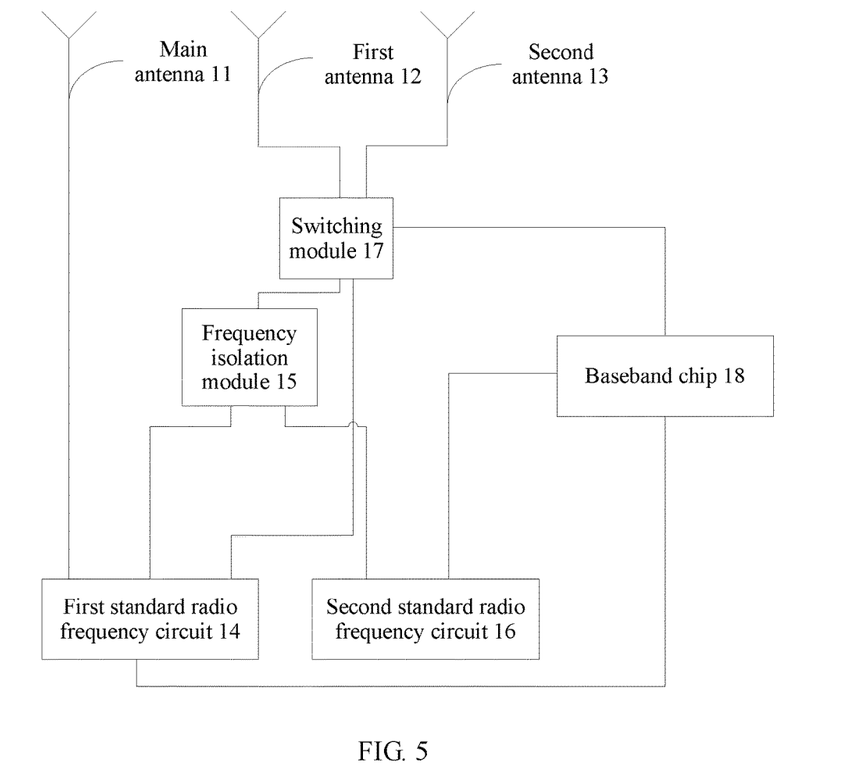
FIG. 5 is a schematic structural diagram of still another wireless terminal according to an embodiment of the present disclosure.

Referring to FIG. 5, FIG. 5 is a schematic structural diagram of still another wireless terminal according to an embodiment of the present disclosure. Based on the structure of the wireless terminal shown in FIG. 2, the wireless terminal further includes a baseband chip 18. The baseband chip 18 is connected to the first radio frequency circuit 14, the second radio frequency circuit 16, and the switching module 17, and is configured to, by controlling the switching module 17, implement controlling the second antenna or the first antenna to receive the first standard signal of the second frequency band, controlling the first radio frequency circuit to receive and transmit the first standard signal, and controlling the second radio frequency circuit to receive and transmit the second standard signal.

An example in which the first standard signal is an LTE signal and the second standard signal is a GSM signal is described below. The first standard signal of the first frequency band is denoted as LTE_UHB, and the first standard signal of the second frequency band is denoted as LTE_HB.

Figure 6:
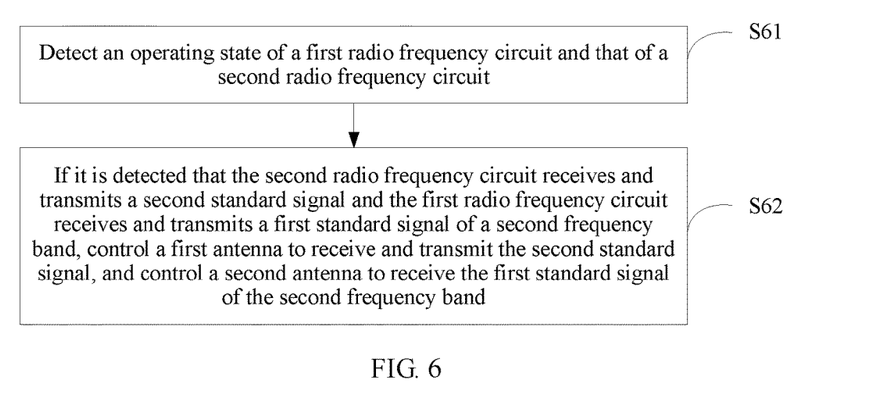
FIG. 6 is a flowchart of an antenna switching control method for a wireless terminal according to an embodiment of the present disclosure.

Referring to FIG. 6, FIG. 6 is a flowchart of an antenna switching control method for a wireless terminal according to an embodiment of the present disclosure. The method may be applied to the wireless terminal shown in FIG. 5. The method may be executed by, but is not limited to, the baseband chip 18 in FIG. 5. The method further includes the following steps.

Step S61. Detect an operating state of a first radio frequency circuit and that of a second radio frequency circuit.

The first radio frequency circuit is configured to receive a first standard signal, and the second radio frequency circuit is configured to receive and transmit a second standard signal. Therefore, an antenna allocation status can be determined by detecting the operating state of the first radio frequency circuit and that of the second radio frequency circuit.

Step S62. If it is detected that the second radio frequency circuit receives and transmits a second standard signal and the first radio frequency circuit receives and transmits a first standard signal of a second frequency band, control a first antenna to receive and transmit the second standard signal, and control a second antenna to receive the first standard signal of the second frequency band.

When it is detected that the second radio frequency circuit receives and transmits the second standard signal and the second standard signal is a GSM signal, that is, when it is detected that a user is performing a voice conversation service, it needs to be ensured that the service is normally performed. Therefore, the first antenna needs to be controlled to receive and transmit the second standard signal, and the second antenna intelligently receives the first standard signal of the second frequency band.

Figure 7:
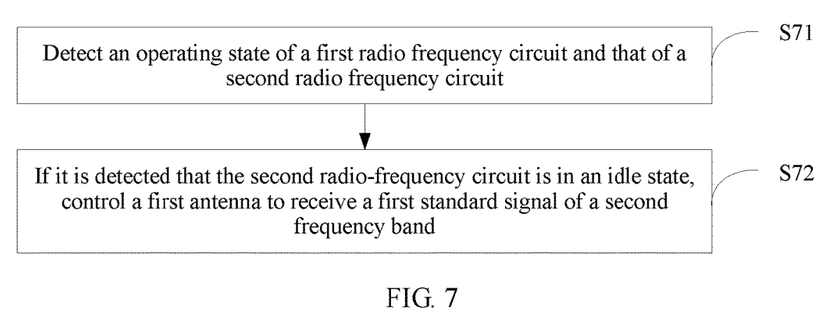
FIG. 7 is a flowchart of another antenna switching control method for a wireless terminal according to an embodiment of the present disclosure.

Referring to FIG. 7, FIG. 7 is a flowchart of another antenna switching control method for a wireless terminal according to an embodiment of the present disclosure. The method may be applied to the wireless terminal shown in FIG. 5. The method may be executed by, but is not limited to, the baseband chip 18 in FIG. 5. The method further includes the following steps.

Step S71. Detect an operating state of a first radio frequency circuit and that of a second radio frequency circuit.

Step S72. If it is detected that the second radio frequency circuit is in an idle state, control a first antenna to receive a first standard signal of a second frequency band.

The first antenna is a full-band antenna, and has better performance than a second antenna. Therefore, when the second radio frequency circuit is in an idle state, that is, when the first antenna is in an idle state, the switching module may switch the first antenna to receive the first standard signal of the second frequency band in order to improve performance of the first standard signal of the second frequency band.

Figure 8:
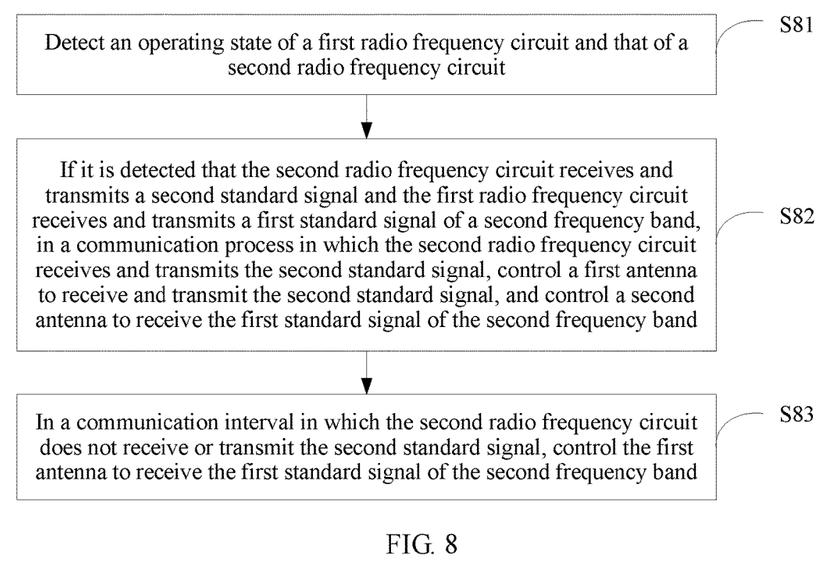
FIG. 8 is a flowchart of another antenna switching control method for a wireless terminal according to an embodiment of the present disclosure.

Referring to FIG. 8, FIG. 8 is a flowchart of another antenna switching control method for a wireless terminal according to an embodiment of the present disclosure. The method may be applied to the wireless terminal shown in FIG. 5. The method may be executed by, but is not limited to, the baseband chip 18 in FIG. 5. The method further includes the following steps.

Step S81. Detect an operating state of a first radio frequency circuit and that of a second radio frequency circuit.

Step S82. If it is detected that the second radio frequency circuit receives and transmits a second standard signal and the first radio frequency circuit receives and transmits a first standard signal of a second frequency band, in a communication process in which the second radio frequency circuit receives and transmits the second standard signal, control a first antenna to receive and transmit the second standard signal, and control a second antenna to receive the first standard signal of the second frequency band.

Step S83. In a communication interval in which the second radio frequency circuit does not receive or transmit the second standard signal, control the first antenna to receive the first standard signal of the second frequency band.

The first antenna is a full-band antenna, and has better performance than a second antenna. Therefore, in the communication interval in which the second radio frequency circuit does not receive or transmit the second standard signal, the switching module may switch the first antenna to receive the first standard signal of the second frequency band in order to improve performance of the first standard signal of the second frequency band.

Figure 9:
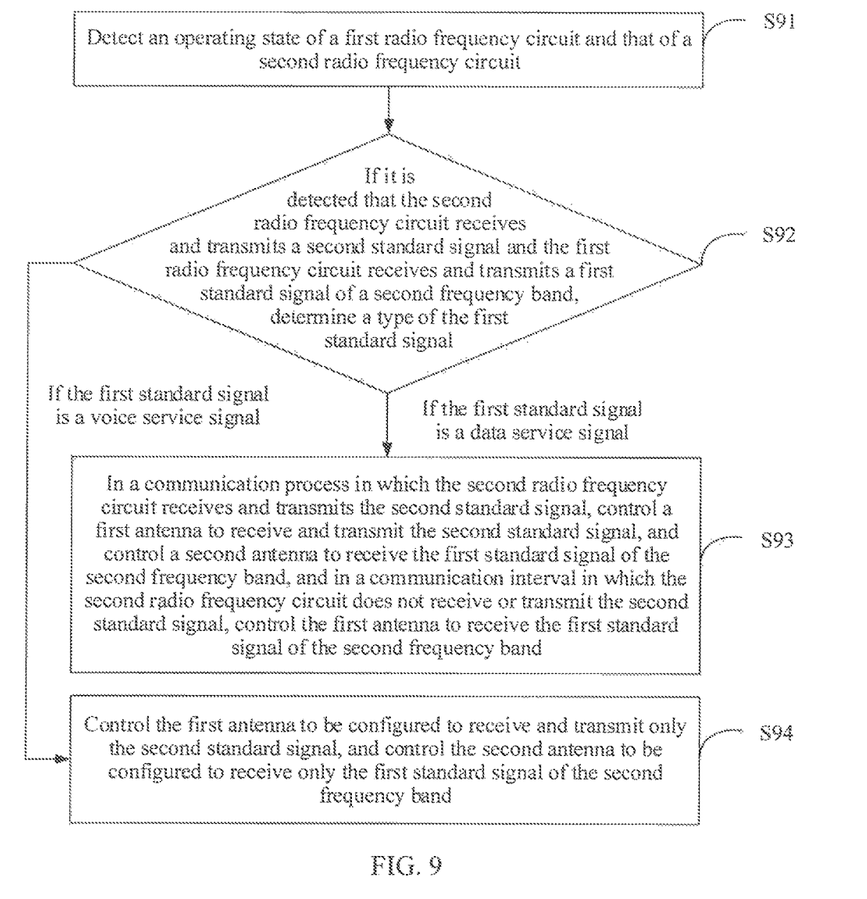
FIG. 9 is a flowchart of another antenna switching control method for a wireless terminal according to an embodiment of the present disclosure.

Referring to FIG. 9, FIG. 9 is a flowchart of another antenna switching control method for a wireless terminal according to an embodiment of the present disclosure. The method may be applied to the wireless terminal shown in FIG. 5. The method may be executed by, but is not limited to, the baseband chip 18 in FIG. 5. The method further includes the following steps.

Step S91. Detect an operating state of a first radio frequency circuit and that of a second radio frequency circuit.

Step S92. If it is detected that the second radio frequency circuit receives and transmits a second standard signal and the first radio frequency circuit receives and transmits a first standard signal of a second frequency band, determine a type of the first standard signal, and if the first standard signal is a data service signal, perform step S93, or if the first standard signal is a voice service signal, perform step S94.

Step S93. In a communication process in which the second radio frequency circuit receives and transmits the second standard signal, control a first antenna to receive and transmit the second standard signal, and control the second antenna to receive the first standard signal of the second frequency band, and in a communication interval in which the second radio frequency circuit does not receive or transmit the second standard signal, control the first antenna to receive the first standard signal of the second frequency band.

Step S94. Control the first antenna to be configured to receive and transmit only the second standard signal, and control the second antenna to be configured to receive only the first standard signal of the second frequency band.

For some types of services, frequent antenna switching causes periodical signal strength fluctuation. This affects service quality. Therefore, before antenna switching control is performed, a service type needs to be determined. For a data service, in the communication interval in which the second radio frequency circuit does not receive or transmit the second standard signal, the first antenna may be controlled to receive the first standard signal of the second frequency band. For a voice service, to ensure service quality, the first standard signal of the second frequency band is all received using the second antenna, and the second standard signal is all received using the first antenna. The service type may be determined according to whether the first standard signal and the second standard signal are data service signals or voice service signals, that is, the service type is determined according to specific content of the first standard signal and the second standard signal.

Figure 10:
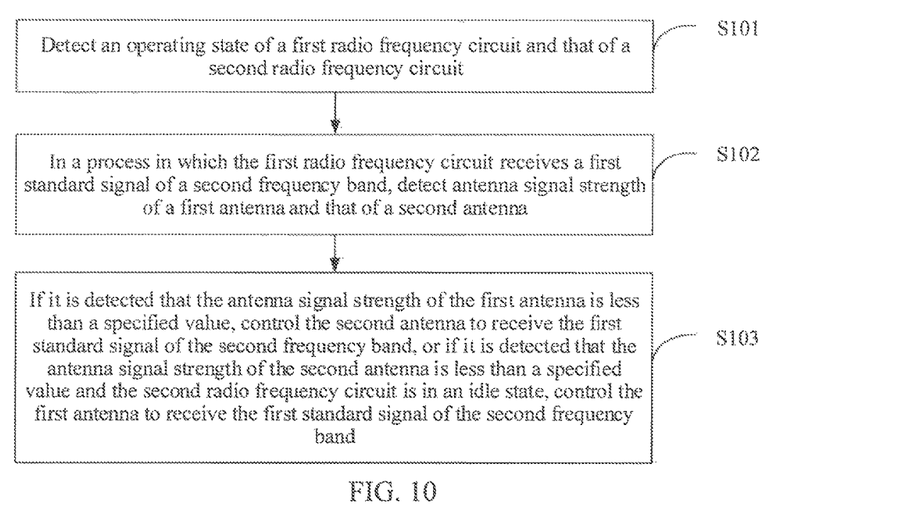
FIG. 10 is a flowchart of still another antenna switching control method for a wireless terminal according to an embodiment of the present disclosure.

Referring to FIG. 10, FIG. 10 is a flowchart of still another antenna switching control method for a wireless terminal according to an embodiment of the present disclosure. The method may be applied to the wireless terminal shown in FIG. 5. The method may be executed by, but is not limited to, the baseband chip 18 in FIG. 5. The method further includes the following steps.

Step S101. Detect an operating state of a first radio frequency circuit and that of a second radio frequency circuit.

Step S102. In a process in which the first radio frequency circuit receives a first standard signal of a second frequency band, detect antenna signal strength of a first antenna and that of a second antenna.

Step S103. If it is detected that the antenna signal strength of the first antenna is less than a specified value, control the second antenna to receive the first standard signal of the second frequency band, or if it is detected that the antenna signal strength of the second antenna is less than a specified value and the second radio frequency circuit is in an idle state, control the first antenna to receive the first standard signal of the second frequency band.

Operations such as holding the wireless terminal by a user affect antenna signal strength. Therefore, in a process in which the first radio frequency circuit receives the first standard signal of the second frequency band, the antenna signal strength of the first antenna and that of the second antenna may be detected, and whether to perform antenna switching is determined according to the detected antenna signal strength in order to ensure service quality and improve user experience.

The specified value may be set according to an actual requirement.

The foregoing is the core idea of the present disclosure. To make a person skilled in the art understand the solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

What is claimed is:
1. A wireless terminal, comprising:
 a main antenna coupled to a first radio frequency circuit and configured to receive and transmit a first standard signal, a frequency band of the first standard signal comprising a first frequency band with a super high frequency and a second frequency band with a high frequency;
 a first antenna coupled to an antenna end of a frequency isolation circuit, a high frequency end of the frequency isolation circuit being coupled to the first radio frequency circuit, a low frequency end of the frequency isolation circuit being coupled to a second radio frequency circuit, and the first antenna being configured to:
  receive the first standard signal of the first frequency band; and
  receive and transmit a second standard signal, a frequency band of the second standard signal is not overlapping the first frequency band; and
 a second antenna coupled to the first radio frequency circuit and configured to receive the first standard signal of the second frequency band.

2. The wireless terminal of claim 1, further comprising a switching circuit coupled to the first antenna, the second antenna, the antenna end of the frequency isolation circuit, and the first radio frequency circuit and configured to switch the first antenna to receive the first standard signal of the second frequency band.

3. The wireless terminal of claim 2, wherein the switching circuit comprises:
a first single-pole double-throw switch, a non-movable end of the first single-pole double-throw switch being coupled to the first antenna, and a movable end of the first single-throw double-throw switch being configured to switch between the antenna end of the frequency isolation circuit and a second single-pole double-throw switch, and
the second single-pole double-throw switch coupled to the first single-pole double-throw switch, a non-movable end of the second single-pole double-throw switch being coupled to the first radio frequency circuit, and a movable end of the second single-pole double-throw switch being configured to switch between the first single-pole double-throw switch and the second antenna.

4. The wireless terminal of claim 2, wherein the switching circuit comprises a double-pole double-throw switch, two non-movable ends of the double-pole double-throw switch being respectively coupled to the first antenna and the second antenna, and two movable ends of the double-pole double throw switch being respectively coupled to the antenna end of the frequency isolation circuit and the first radio frequency circuit.

5. The wireless terminal of claim 2, wherein the switching circuit comprises a double-pole double-throw switch, two movable ends of the double-pole double-throw switch being respectively coupled to the first antenna and the second antenna, and two non-movable ends of the double-pole double-throw switch being respectively coupled to the antenna end of the frequency isolation circuit and the first radio frequency circuit.

6. The wireless terminal of claim 1, wherein the frequency isolation circuit comprises a diplexer.

7. An antenna switching control method for a wireless terminal, comprising:
controlling a first antenna to receive and transmit a second standard signal when it is detected that a second radio frequency circuit receives and transmits the second standard signal and a first radio frequency circuit receives and transmits a first standard signal of a second frequency band, the wireless terminal comprising a main antenna, the first antenna, a second antenna, the first radio frequency circuit being configured to receive and transmit the first standard signal comprising a first frequency band with super high frequency and the second frequency band with high frequency, a frequency isolation circuit, and the second radio frequency circuit being configured to receive and transmit the second standard signal not overlapping the first frequency band of the first standard signal; and
controlling the second antenna to receive the first standard signal of the second frequency band.

8. The method of claim 7, further comprising controlling the first antenna to receive the first standard signal of the second frequency band when it is detected that the second radio frequency circuit comprises an idle state.

9. The method of claim 7, wherein when it is detected that the second radio frequency circuit receives and transmits the second standard signal and the first radio frequency circuit receives and transmits the first standard signal of the second frequency band, the method comprises:
controlling the first antenna to receive and transmit the second standard signal, and controlling the second antenna to receive the first standard signal of the second frequency band in a communication process in which the second radio frequency circuit receives and transmits the second standard signal; and
controlling the first antenna to receive the first standard signal of the second frequency band in a communication interval in which the second radio frequency circuit does not receive or transmit the second standard signal.

10. The method of claim 7, wherein when it is detected that the second radio frequency circuit receives and transmits the second standard signal and the first radio frequency circuit receives and transmits the first standard signal of the second frequency band, the method further comprises:
controlling the first antenna to receive and transmit the second standard signal, and controlling the second antenna to receive the first standard signal of the second frequency band when the first standard signal comprises a data service signal and in a communication process in which the second radio frequency circuit receives and transmits the second standard signal; and
controlling the first antenna to receive the first standard signal of the second frequency band in a communication interval in which the second radio frequency circuit does not receive or transmit the second standard signal.

11. The method of claim 7, further comprising:
detecting antenna signal strength of the first antenna and the second antenna in a process in which the first radio frequency circuit receives the first standard signal of the second frequency band; and
controlling the second antenna to receive the first standard signal of the second frequency band when it is detected that the antenna signal strength of the first antenna is less than a specified value.

12. The method of claim 7, wherein when it is detected that the second radio frequency circuit receives and transmits the second standard signal and the first radio frequency circuit receives and transmits the first standard signal of the second frequency band, the method further comprises:
controlling the first antenna to receive and transmit the second standard signal, and controlling the second antenna to receive the first standard signal of the second frequency band when the first standard signal comprises a data service signal and in a communication process in which the second radio frequency circuit receives and transmits the second standard signal; and
controlling the first antenna to receive and transmit only the second standard signal, and controlling the second antenna to receive only the first standard signal of the second frequency band when the first standard signal comprises a voice service signal.

13. The method of claim 6, further comprising:
detecting antenna signal strength of the first antenna and the second antenna in a process in which the first radio frequency circuit receives the first standard signal of the second frequency band; and
controlling the first antenna to receive the first standard signal of the second frequency band when it is detected that the antenna signal strength of the second antenna is less than the specified value and the second radio frequency circuit comprises in an idle state.

* * * * *

UNITED STATES PATENT AND TRADEMARK OFFICE
CERTIFICATE OF CORRECTION

PATENT NO. : 10,333,563 B2
APPLICATION NO. : 16/067719
DATED : June 25, 2019
INVENTOR(S) : Linghua Yuan, Dongxing Tu and Zhijun Chen It is certified that error appears in the above-identified patent and that said Letters Patent is hereby corrected as shown below:

On the Title Page

Item (56), under FOREIGN PATENT DOCUMENTS: "10368622" should read "103368622"

In the Claims

Claim 3, Column 11, Line 12: "single-throw" should read "single-pole"

Claim 13, Column 12, Line 60: "claim 6" should read "claim 7"

Signed and Sealed this
Twenty-seventh Day of August, 2019

Andrei Iancu
*Director of the United States Patent and Trademark Office*